United States Patent [19]

Hartman et al.

[11] Patent Number: 5,006,293

[45] Date of Patent: Apr. 9, 1991

[54] PROCESS FOR FORMING FLAT PLATE BALLISTIC RESISTANT MATERIALS

[75] Inventors: David R. Hartman, Newark; Ralph B. Jutte, Hebron; Terry R. Beaver, Nashport; Homer G. Hill, Newark, all of Ohio

[73] Assignee: Owens-Corning Fiberglas Corporation, Toledo, Ohio

[21] Appl. No.: 305,143

[22] Filed: Feb. 2, 1989

[51] Int. Cl.$^5$ .................. B29C 43/18; B29C 43/20; B29C 43/58

[52] U.S. Cl. .................. 264/137; 264/40.5; 264/40.6; 264/258; 428/911; 523/511

[58] Field of Search .................. 428/911; 525/19; 523/501, 505, 511; 156/245; 264/258, 137, 40.5, 40.6

[56] References Cited

U.S. PATENT DOCUMENTS

| | | | |
|---|---|---|---|
| 2,568,331 | 9/1951 | Frilette | 260/40 |
| 3,431,320 | 12/1967 | Baum | 260/865 |
| 3,465,061 | 11/1967 | Fekete | 260/865 |
| 4,100,229 | 7/1978 | Schwartz | 523/511 |
| 4,101,604 | 7/1978 | Rowe | 529/19 |
| 4,110,278 | 8/1978 | Demmier | 523/511 |
| 4,138,385 | 2/1979 | Uffner | 525/17 |
| 4,290,939 | 9/1981 | Bertsch | 525/438 |
| 4,403,012 | 9/1983 | Harpell | 428/290 |
| 4,529,640 | 7/1985 | Brown | 428/116 |
| 4,555,534 | 11/1985 | Atkins | 523/511 |
| 4,639,387 | 1/1987 | Epel | 428/113 |
| 4,664,967 | 5/1987 | Tasdemiroglu | 428/220 |
| 4,732,803 | 3/1988 | Smith, Jr. | 428/212 |
| 4,822,439 | 4/1989 | Gauchel | 156/285 |

OTHER PUBLICATIONS

Mil-L-G2474B (AT) Military Specification 25 Jun. 1984, "Laminate:Aramid-Fabric-Reinforced, Plastic", Ballistic Impact Behavior of High Strength Glass Fiber Compostes, Jan. 27, 1986, D. R. Hartman.
"Discover S-2 Glass Fiber a New State of Art", Owens-Corning Fiberglas Corporation Publication 5-AS-P-1301, 1985.
"Peroxyesters", Penwolt Product Bulletin #7-81-M.
"Thickeners and Low Shrink Additives for Premix and SMC Systems", Frank Fekete, SPI 1970.
Monthly Report-Jun. 1985, "Army Materials and Mechanics Research Center", Contract #DAAG-4-6-8-5-C-0006.
"A Comparative Study of Ballistic Performance of Glass Reinforced Plastic Materials", Vasudev et al., SAMPE quarterly 7-1987.
"Ballistic Performance of Thick S-2 Glass Composites", by Bless, Hartman and Hanchak.
"Ballistic Performance of S-2 Glass Laminates", by Bless, Okajima, Hartman and Hanchak.
Laible, Roy C., "Ballistic Materials and Penetration Mechanics", vol. 5, of Methods and Phenomena: Their Applications in Science and Technology, Elsevier Scientific Publishing Company, 1980.

Primary Examiner—Jay H. Woo
Assistant Examiner—Jeremiah F. Durkin, II
Attorney, Agent, or Firm—Patrick P. Pacella; Ted C. Gillespie; Catherine B. Martineau

[57] ABSTRACT

A process for forming flat plate ballistic resistant composites which includes impregnating a low-alkali magnesia-aluminum-silicate glass fiber woven roving with an impregnating composition. The impregnating composition includes a resin solution of a polyester resin in a polymerizable monomeric solvent a free radical catalyst and optionally, a thickening agent and further optionally a flame retardant material. The impregnated woven roving is cured in a molding unit at a temperature of about 225°–255° F. for a sufficient period of time and at a sufficient pressure to allow the impregnated woven roving to substantially conform to the mold unit. The temperature and pressure used are sufficient to maintain the exothermic temperature at about 300° F. or below and to catalytically crosslink the polyester resin and monomeric solvent.

15 Claims, 7 Drawing Sheets

PROCESS FOR FORMING FLAT PLATE BALLISTIC RESISTANT MATERIALS

BACKGROUND OF THE INVENTION

The present invention relates to a process for forming ballistic flat plate resistant materials comprising glass fibers and polyester resin.

Ballistic resistant articles containing high strength fibers are known to be useful for a variety of military applications. Such fibers in fabric form are encapsulated or embedded in a thermoset resin to form a composite article. Military Specification MIL-L-62474B provides an example of one such laminate or composite employing a polyaramide and a laminating resin which is the cured reaction product of polyvinyl butyral, phenol formaldehyde, and trimethylol phenol and phthalic anhydride. Such laminates, while useful for various armor applications have some drawbacks. One drawback in particular is that these laminates cannot be used to form flat plate ballistic resistant materials without compromising the structural strength of the material.

In order for a composite to be useful for flat plate ballistic resistant applications, it is important that the composite possess a wide balance of properties including satisfactory performance as a ballistic system and meet fire-resistance, smoke-resistance and non-toxicity standards It is also important that the composite possessing these desirable properties be capable of being manufactured in an efficient manner. Currently, processes for producing flat plate ballistic resistant composites require labor intensive manufacturing operations.

A composite having these properties is identified herein and is formed from woven glass roving made from high strength magnesia aluminosilicate glass fibers and an unsaturated isophthaic-maleic-propylene glycol polyester resin which can be cured to a thermoset condition with a comonomer comprising, for example, styrene, diallyl phthalate or methyl methacrylate, and a free radical catalyst. Resin solutions which are identified herein as producing satisfactory results include a resin system having a low acid number polyester. Due to the properties of the resin system, the manufacturing of such ballistic resistant composites of this type have only previously been possible using a manual hand layup technique. However, this technique is not well adapted for the reliable production of flat plate composites in an expedient commercial and economical manner.

In accordance with the present invention an economical and commercially satisfactory process is provided for manufacturing flat plate composites. Typically the composites can be formed having thickness on the order of at least about 1/16 inch and the process is surprisingly capable of producing high quality composites having thickness of up to and including 3 inches in thickness. According to the present invention, the resin is cured by the use of a polymerizable monomer such as styrene and a free radical initiator. It has not been previously expected that such flat plate composites could be expediently formed since it is known that problems often result due to internal cracking of the composite as a result of the exothermic reaction which occurs during the forming process of the flat plate composites.

It is therefore, an object of this invention to provide a process for the production of flat plate ballistic resistant materials.

SUMMARY OF THE INVENTION

The invention relates to a process for producing flat plate ballistic resistant materials comprising impregnating a woven glass fiber roving with a suitable resin solution comprising a polyester prepolymer resin and a polymerizable monomer in the presence of a free radical catalyst under suitable cure conditions. The polymerizable monomer acts as both a solvent for the polyester prepolymer resin and as a free radical initiator.

The invention relates, in particular, to a process for forming a ballistic resistant flat plate composite material by impregnating a low-alkali, magnesia-aluminum-silicate glass composition, at glass fractions in the range of 75-85% by weight and higher, with an impregnating composition comprising a resin matrix formed in the presence of a polyester prepolymer resin and a polymerizable monomeric solvent (as a source of free radicals), a thickening agent, and a free radical catalyst, and, optionally, a flame retardant material. Suitable polymerizable monomers, as a source of free radicals, include, for example styrene, diallyl phthalate and methyl methacrylate Suitable polyester prepolymers include, for example, an isophthalic-maleic-propylene glycol polyester, and maleic polyester or a mixture of both. Suitable free radical catalysts include, for example, benzoyl peroxide, and tertiary butyl perbenzoate. The polyester prepolymer and polymerizable monomers are cured under conditions to avoid excessive exothermic heat energy from the free radical catalyst-initiated crosslinking of the polyester prepolymers and the monomers. The impregnated glass composition is cured in a sheet compression molding unit at a temperature of about 225°-255° F. for a sufficient period of time to allow the impregnated glass composition to substantially conform to the molding unit and at a pressure sufficient to maintain the exothermic temperature at a temperature of about 300° F. or below and to catalytically crosslink the polyester resin and monomer.

In particular, one embodiment of the present invention relates to molding a composition comprising 78-82% low alkali, magnesia-aluminum-silate woven glass fiber rovings, with an impregnating composition comprising 0.5% tertiary butyl perbenzoate in isophthalic-maleic-propylene glycol polyester resin in a styrene solvent, in a volume percent of about 35% and below, optionally with or without calcium hydroxide thickener, and optionally with or without alumina trihydrate, wherein the molding time ranges from 15-30 minutes, and the molding temperature ranges from about 225°-255° F. The molding time at these molding temperatures is dependent on the desired laminate thickness of the composition and length of time needed to cool the composition under pressure.

The ballistic resistant materials formed according to the process of the present invention have a high glass content, in the range of about 75 to about 85% or higher, by weight, low alkali, magnesia-aluminum-silicate, and contain polyester resins having high compressive yield strength and shear modulus, low interfacial shear strength (i.e., due to low bonding size), resulting from the controlled exothermic reaction (in the range of about 50°-100° F. above polyester Tg glass transistion) which occurs during the curing of the ballistic resistant material.

The flat plate ballistic resistant materials formed according to the process of the present invention have enhanced mechanical properties and desirable fire-smoke resistance, ease of favrication and improved manufacturing efficiency.

DESCRIPTION OF THE INVENTION

The proper combination of both optimal materials and process conditions is necessary for forming a flat plate ballistic resistant material having the desired ballistic resistance performance and the necessary fire and smoke resistance.

The present invention relates to a process for producing flat plate ballistic resistant materials comprising impregnating a woven glass roving with a suitable resin solution comprising at least one polyester prepolymer resin and at least one polymerizable monomer in the presence of at least one free radical catalyst under suitable cure conditions. The polymerizable monomer acts as both a solvent for the polyester prepolymer and as a free radical initiator.

The invention relates, in particular, to a process for producing flat plate ballistic resistant materials comprising impregnating a woven glass roving, preferably a low-alkali, magnesia-aluminum-silicate glass composition at glass fractions of about 75%, by weight, or greater, with a suitable polyester resin and a polymerizable monomeric solvent, in a volume percent of about 35% or below, under suitable cure conditions wherein excessive exothermic energy is avoided and wherein the polyester resin and monomeric solvent are catalytically crosslinked.

The woven glass roving is desirably made from fibers of a magnesia aluminum-silicate glass and can be, for example, a plain weave, twill weave or satin weave woven roving, or a unidirectional cross ply weave. The magnesia aluminum-silicate glass fibers used herein are high strength fibers and typically have a tensile strength in excess of about 500,000 psi. These fibers are roughly about two-thirds, by weight, silica, and typically on the order of about 65%, by weight, silica, and about one-third, by weight, magnesia and alumina, with alumina being present in a greater amount than magnesia. Typically alumina will be present in an amount of about 25%, by weight, and magnesia present in an amount of about 10% by weight.

In a preferred embodiment, the fibers have a water resistant, size coating thereon which allows wetting of the fiber with the resin solution but which coating is not chemically reactive with the polyester resin. Preferred size coatings for use with the present polyesters for ballistic applications are sizes containing an epoxy based film former (such as, for example bisphenol epichlorohydrin) and an epoxy silane coupling agent (such as A-187 from Union Carbide or Z-6040 from Dow Corning, namely gamma-glycidoxypropyltrimethoxy silane) or a methylsilane coupling agent (such as A-163 from Union Carbide or Z-6070 from Dow Corning, namely methyltrimethoxy silane) along with other conventional materials. It is also contemplated that other coupling agents, such as Z-6071 from Dow Corning namely benzyltrimethoxy silane or combinations thereof can be utilized with this invention. Such sizings allow stresses to be transferred to the fiber under normal rates of mechanical loading but allows the resin to debond from fibers under a rapid loading rate such as a ballistic event. Water resistance of the size can be tested by a boiling water test in which the fibers are immersed for about 2 hours and then dried. Fibers which retain at least about 80% of their original flexural strength possess sufficient water resistance. Debonding can be evaluated by a standard short beam shear test which measures interfacial shear strength. Interfacial shear strengths by the short beam shear test (ASTM D-2344) of less than about 5,000 psi preferably less than about 4,000 psi and most desirably less than about 2,000 psi will produce good results. In a preferred embodiment, the woven glass roving is that made from S-2 Glass ® glass fibers and is commercially available from Owens-Corning Fiberglas Corporation with either their sizing designation of 463 or 463M. In a preferred embodiment, the woven roving has a weight per unit area of between about 18-48 ounces per square yard, The high tensile and compressive strength of S-2 Glass ® fiber reinforced laminates contribute to both ballistic and structural performance of rigid and structural armor. The high ultimate elongation of the S-2 Glass ® fiber approximately 5.7%) is important for the dynamic ballistic impact-absorbance of the armor.

According to the present invention, various polyester resins can be utilized. One particularly suitable resin is an isophthalic-maleic-polypropylene glycol polyester resin. As used herein the term isophthalic-maleic-propylene glycol polyester resin refers to a low acid number polyester (i.e., one generally having an acid number of less than about 12.5). The isophthalic-maleic-propylene glycol polyester is an unsaturated thermosettable polyester which can be formed from isophthalic acid, maleic anhydride and propylene glycol. The terminology "acid" contemplates the anhydride and vice versa. The isophthalic-maleic-propylene glycol polyester can be formed by reacting esters of such anhydrides or acids and esters of propylene glycol as well.

A suitable low acid number, unsaturated, thermosettable isophthalic-maleic-propylene glycol polyester in the ratio of approximately 2:1:1 is available from Owens-Corning Fiberglas Corporation under their designation E-780 polyester resin. The E-780 polyester resin is free of any amine accelerators, for example, aniline or substituted anilines, which may have an adverse impact on the needed control of thickening. Such accelerators are commonly employed to accelerate the polyester and monomer reaction. An amine-free resin solution which is also suitable but which has a lower non-volatiles content is the E-701 polyester resin also available from Owens-Corning Fiberglas Corporation. These isophthalic resins have acid numbers ranging between about 7 to about 12.5 and typically less than about 9. E-780 polyester resin is nominally about 34% styrene whereas the amine-free E-701 polyester resin is nominally about 45% styrene.

It is also within the contemplated scope of the present invention that other polyester resins, such as maleic-propylene glycol polyester can be used. The maleic-propylene glycol polyester has an acid number ranging from about 18-23, depending upon the specific thickener material being utilized. For example, suitable polyesters include the E980 polyester resin available from the Owens-Corning Fiberglas Corporation and which comprises isophthalic-maleic-propylene glycol polyester (1:1:1); the E-903 polyester resin available from the Owens-Corning Fiberglas Corporation and which comprises propylene glycol maleate; and the P-340 polyester resin available from Owens-Corning Fiberglas Corporation and which comprises propylene glycol maleate (1:1).

The resin solution, that is the polyester resin and the polymerizable monomeric solvent, ranges from about 53 to about 70% by weight of the impregnating composition and the resin solution typically has a viscosity of about 300 to about 1500 centipoise.

In preferred embodiments of the present invention, the polymerizable monomeric solvent comprises styrene, diallyl phthalate, methyl methacrylate or a combination of any of these solvents. For example, when the P-340 resin is utilized an especially preferred monomeric solvent comprises dially phthalate and methyl methacrylate.

When dially phthalate is employed as the monomeric solvent the viscosity may be in the higher end of the range. Typically, when styrene is used, to the exclusion of the diallyl phthalate, the viscosities of the solution will be around 300 to 600 or 700 cps. When diallyl phthalate is employed along with styrene as the solvent and polymerizable monomer, the preferred ratio of diallyl phthalate to styrene is generally less than about 2:5 (on a weight basis). When alphamethyl styrene is employed in the resin solution (generally in an amount less than about 3% by weight). The alpha-methyl styrene aids in suppressing the intensity of the curing exotherm.

The free radical catalyst is used to initiate crosslinking of the polyester prepolymer and the polymerizable monomer. It is desired that the catalyst be selected such that the initiation and exothermic temperatures of the reaction are not too violent and are reasonably self-controlling to thereby allow the formation of the flat plate composites. In a preferred embodiment the catalysts used are 0.5% tertiary butyl perbenzoate (tBPB) or 1.0-1.5% benzoyl peroxide (BPO). Other preferred catalysts are for example, a combination of tertiary butyl perbenzoate and benzoyl peroxide, or the catalyst Lupersol 256 which comprises 2,5-dimethyl-2,5-bis-(2-ethylhexanoylperoxy)hexane, or other desired combinations of catalysts.

Calcium hydroxide, along with the water, (or glycerin or mixture of water and glycerin) is a suitable thickening agent to controllably thicken the resin solution to provide the needed viscosities at the various critical times, and can be obtained from any source. One particularly suitable thickener material is available from Plasticolors, Inc., under their designation PG-9104, and contains about 30% by weight of active calcium hydroxide in a non-thickening oligomeric styrene grinding paste.

It is within the contemplated scope of the present invention that various adjuvants may be added to the impregnating composition. Fumed silica (e.g., Cab-O-Sil material) can be added to reduce flow in the final rolled package. A material comprises hydrated alumina (e.g., Solem 332 available from Solem Industries or Hydral 710 available from Alcoa Inc. alumina trihydrate material) can be added as a flame retardant material in order to meet desired fire-smoke requirements without creating toxicity problems.

In one embodiment of the present invention, an impregnating composition having all of the above noted important characteristics and which yet provides a final composite having all of the properties necessary for the article to satisfactory perform as a ballistic resistant material is formed by combining (i) calcium hydroxide, (ii) a catalyst such as tertiary butyl perbenzoate (tBPB) or benzoyl peroxide (BPO), and (iii) optionally an alumina trihydrate and (iv) a solution of a low acid number isophthalic-maleic-propylene glycol polyester resin in a solvent of monomeric styrene or a solvent which is a mixture of monomeric styrene and monomeric diallyl phthalate. In a preferred embodiment, the tBPB catalyst can be used to ensure obtaining a complete ultimate cure of the polyester and, when present, is generally used in amounts effective to obtain complete cure. Complete cure generally means obtaining a cured condition of the polyester such that the glass transition temperature is within about 10 centigrade degrees of the maximum obtainable glass transition temperature. The use of tBPB as a catalyst is especially advantageous when diallyl phthalate is present. In a preferred embodiment the tBPB catalyst is present in an amount of between from 0 to about 0.6% (based on resin solution) depending on desired laminate thickness to be produced.

The amount of impregnating composition employed is selected so that the finally cured composite or laminate contains about 75 to about 85%, by weight, of the woven glass roving. In general a sufficient number of plies of prepregs will be compression molded to provide a final composite thickness of about 1/16 to about 3 inches.

In a preferred process of the present invention, a moving conveyor is used and a continuous plastic carrier film, e.g., a polyolefin but preferably a coextrusion of a polyolefin and nylon (polyamide) is supplied to the conveyor from a roller. As the conveyor moves, along with the film that it carries, a layer of the impregnating composition is discharged onto the film and the woven glass roving is then embedded into the impregnating composition layer to achieve impregnation of the glass fiber woven rovings. The impregnated woven roving materials are then supplied to compression rollers which act to "dry" the materials by compressingly removing excess liquid impregnating solution and forming a prepreg material. The impregnated prepreg material exiting from the compression rollers is then wound in the form of a roll.

From the time the impregnating composition is prepared up to the time that impregnation of the woven roving is substantially completed (including passage through the compression rolls) less than approximately 30 minutes transpires when typical equipment is employed. As indicated above, it is desirable to be able to mold the prepreg material reasonably promptly after its formation and collection as a roll. In a practical operation using such typical equipment, this means that shortly after impregnation the prepreg material should be in a condition for molding. This, in turn, means that after a short time interval, the supporting plastic film upon which the prepreg was formed must be capable of being conveniently removed from the prepreg material. Furthermore, it is desirable that the free radical initiator be selected such that the initiation and exothermic temperatures of the reaction are not too violent and is reasonably self-controlling.

According to the process of the present invention the molding time ranges from about 15–30 minutes, at a platen temperature of about 225°–255° F. The temperature varies depending on the laminate thickness of the flat plate ballistic material and the time required to cool the material under pressure. It is desired that the exothermic temperature be approximately 300° F. In preferred embodiments the impregnated woven roving is cured at a pressure of about 100–600 psi for about 30 minutes or less.

In one embodiment of the present invention, the impregnation process starts by metering the impregnating composition onto a plastic carrier film that is fed to run along the bottom of the conveyor belt.

A doctor blade controls the amount of impregnating composition that goes on the carrier film. A typical thickness range of the impregnating composition being supplied to the carrier is 20 to 30 mils. Because impregnating composition content of the final laminate product is low (15–35 percent), uniform dispersion of the impregnating composition on the carrier film is important to ensure consistency and good wet-out.

The carrier film with the impregnating composition is conveyed to an area where the glass fiber woven roving material is unrolled onto the impregnating composition. The woven roving dispensing rate conforms to the line speed of the machine (for example, 10–16 ft/min.). Then, a second carrier film is applied on top of the glass fiber woven roving material and impregnating composition.

The glass impregnating composition, sandwiched between the two carrier films, is conveyed to a compaction area where a prepreg material is formed. Compaction helps distribute the impregnating composition into the woven roving and works the glass for improved wet-out.

After compaction, the prepreg material is pre-tensioned and rolled onto a standard sheet molding composition (SMC) turret or take-up roller. It is preferred that pre-tensioning be accomplished with a roll, not bulk packaging equipment. After the prepreg roll reaches the desired size, it is overwrapped with a nylon film in order to minimize styrene loss, keep out moisture, and facilitate handling. A sample taken for checking square foot weight, cut from the prepreg just before the roll is completely taken up, and calculated by taking the dry weight of input roving divided by the prepreg weight gives the estimated glass-to-resin ratio for quality control purposes.

In a preferred embodiment, when producing a prepreg roll of 75 to 80 precent glass by weight, tension near the core of the roll is reduced. This prevents the impregnating composition from squeezing out, a phenomenon that can affect uniformity of glass impregnating composition content throughout the prepreg roll. Tension reduction can be accomplished by using a turret or take-up roller having a larger than normal diameter. For example, prepreg rolled onto 10 in diameter tubes had very uniform impregnating composition content. By comparison, a prepreg material rolled onto 3½ in. diameter tubes exhibited differences in impregnating composition content between the material on the inside and outside of the roll.

Achieving proper impregnation of the impregnating composition in the woven roving and prepreg handling characteristics are dependent on maintaining certain levels of viscosity at different steps in the process. The desired thickening profile of the impregnating composition is as follows: (1) before the thickening agent is added, viscosity is 300–1200 cps; (2) viscosity should be under 4,000 cps during compaction for good impregnation; and, (3) a viscosity of at least 25,000 cps is needed when it is time to peel off the film without sticking.

When preparing the impregnating composition the thickening agent is the last ingredient to be mixed. All other ingredients are mixed in sequence and have a pot life of about 12 hours. After the thickening agent is added, the impregnating composition must be processed within 30 minutes.

Within minutes after the impregnating composition is made, resin viscosity is above 25,000 cps, which is sufficient for the film to be peeled off if immediate molding is desired. After the roll has been stored for 24 hours, viscosity plateaus. Shelf life is at least 6 to 8 weeks at 75° F. (24° C.).

EXAMPLE I

The impregnating composition formulations for the compression molding examples which follow are:

| Materials | E780CM(phr) | E780CMFR(filled)(phr) |
|---|---|---|
| Resin E-780 | 83.30 | 83.30 |
| Monomer Styrene | 16.70 | 16.70 |
| Flame retardant Solem SB-322 ATH | | 20.00 |
| Catalyst tBPB | 0.50 | 0.50 |
| Thickening agent PG8194 | 3.00 | 3.00 |
| TOTALS | 103.50 | 123.50 |

The compression molding operation is as follows: The press is preheated to 225°–255° F. in order to minimize peak exothermic temperature and residual stresses in molded laminates. The mold can be waxed or a mold release film can be used. A laminate is built up outside the press on a supporting transfer surface as follows: The layer of mold release film is placed down first. Next, a layer of "peel-ply," carrier film such as Teflon-coated fabric, is laid down. Then, the appropriate shape and number of prepreg plies of glass fiber woven rovings are put in place. A layer of the impregnating composition is dispersed onto the woven rovings. This is covered with another layer of peel-ply carrier film, then mold release film. The bulk factor of the stacked prepreg versus molded laminate is about 2:1.

The finished laminate is placed in the press. Thermocouples are placed in the center of the laminate, about 1 inch from the edge, to monitor the temperature profile. Steel or aluminum shims are placed around the perimeter of the laminate to control thickness and to restrict the flow of the impregnating composition from the edges of the part. The press is brought down to "stops". The exact pressure utilized depends on the age and viscosity of the prepreg laminate and is preferably in the range of 100–600 psi. In general, the lower the viscosity, the lower the pressure. Molding pressure can be applied with a multiopening laminating press or a single-opening press. For high tonnage presses, pressure can be controlled through a programmable force/velocity/position control package. Or the press can be closed to the required thickness on press "stops" or control shims.

Figure 1:
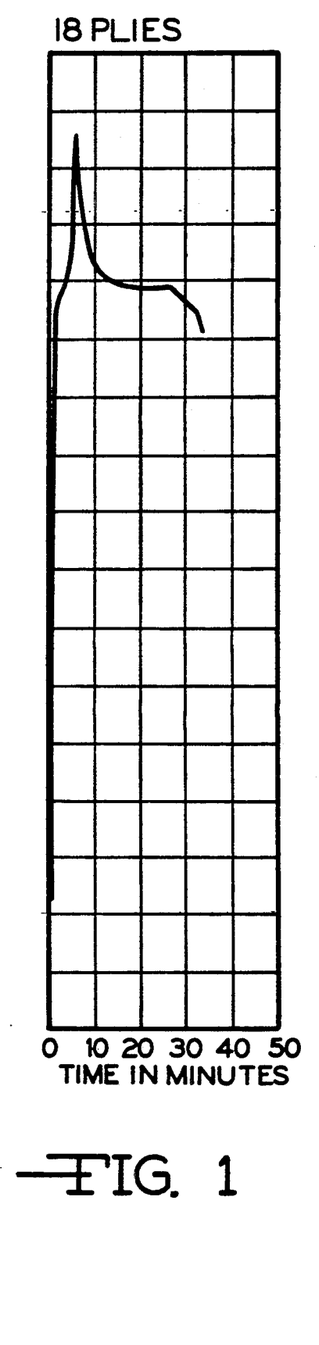
FIGS. 1-3 are a series of graphs showing representative temperature profiles of a composite formed according to the process of the present invention.
Figure 2:
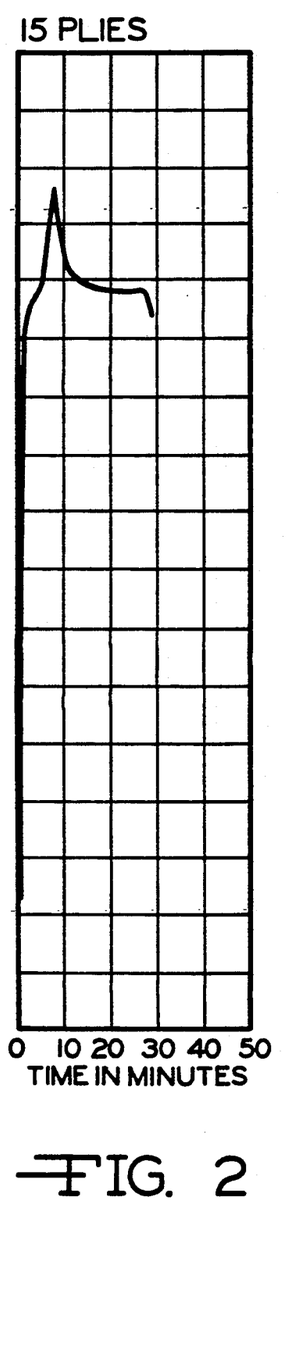
Figure 3:
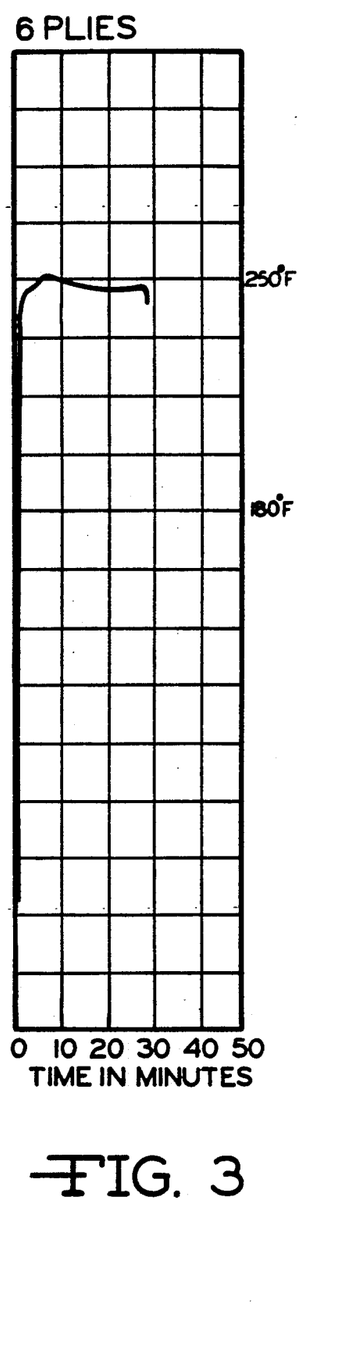

The mold temperature is held in the 225°-255° F. range until evidence of the exothermic reaction is shown on the temperature chart recorder. Representative thermal profiles are shown in the attached FIGS. 1-3. The pressure is maintained until the laminate cools to below 280° F. at the laminate centerline. This improves resin hot strength which prevents delamination when pressure is removed. A typical cycle time for a ½ inch part is 30 minutes. After the part has cooled, it can be cut to size. It is desirable that from ½ to 1 inch of the edge be trimmed from the part.

Glass content is obtained by the following ASTM D2584. This requires a muffle furnace and analytical balance. In a preferred embodiment, glass content by weight in a finished laminate ranges from about 75 to 85%, preferably about 79%, +/− 3 percent.

Figure 4:
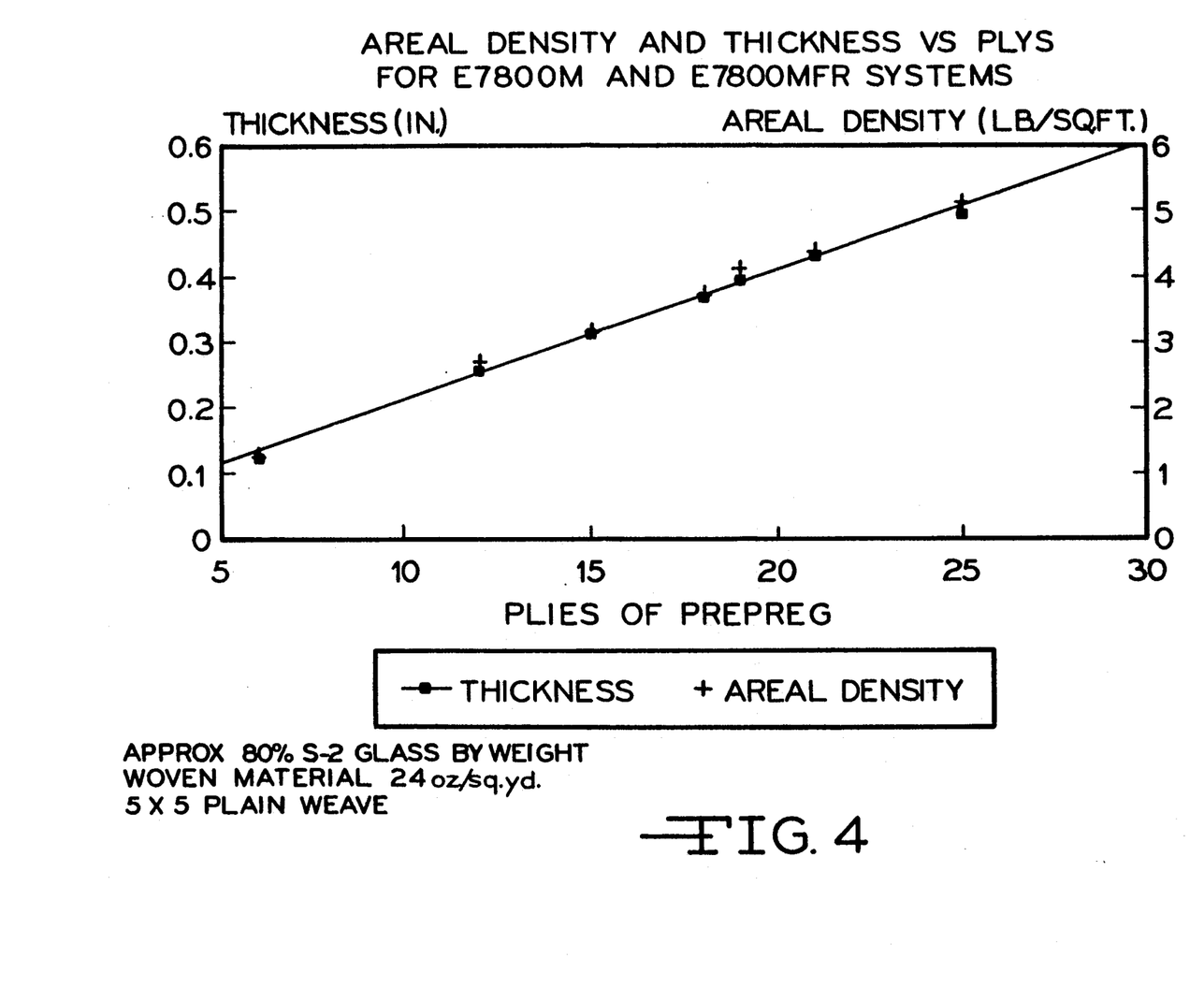
FIG. 4 is a graph showing areal density and thickness verses plies of prepreg composites formed according to the process of the present invention.

The thickness of the finished laminate per ply of prepreg can be estimated at 20 mils/ply. For example, a 25-ply laminate has an average thickness of 0.5 inch. Areal density (lbs/sq.ft) of the finished laminate can be estimated at 1 lb/sq.ft per 0.1 inch of thickness. For example, a 0.5 inch thick panel weights 5 lbs/sq.ft. Empirical data on thickness, number of plies and areal density are shown in FIG. 4.

Other resin formulations which are within the contemplated scope of the present invention include the following:

| Resin | Monomer | Catalyst |
|---|---|---|
| P-340 55-70% | methylmethacrylate 30-45% | tBPB 0.5% |
| 8084* 55-70% | styrene 30-45% | tBPB 0.5%/BPO 1.0% |
| 470* 55-70% | styrene/diallyl phthalate 30-45% | tBPB 0.5%/BPO 1.0% |
| 510* 55-70% | styrene/diallyl phthalate 30-45% | tBPB 0.5%/BPO 1.0% |

*8084, 470 and 510 are vinylester resins commercially available from Dow Derakane and are styrene diluted, free radical initiated, liquid thermosetting resins.

EXAMPLE II

A sample, consisting of one ballistic laminate section, having 3 plies S-2 Glass $^R$ glass fiber, woven roving with 463 sizing, 5×5.12 plain weave impregnated with the E-701 resin solution which comprises isophathalic-maleic-propylene glycol polyester resin and styrene; tBPB catalyst and Ca(OH)$_2$ as the thickening agent was cured 15 minutes at 250° F. The laminate section was tested to determine the glass transition temperature (Tg) and to characterize the molecular weight distribution of a ballistic shelter laminate.

Figure 5:
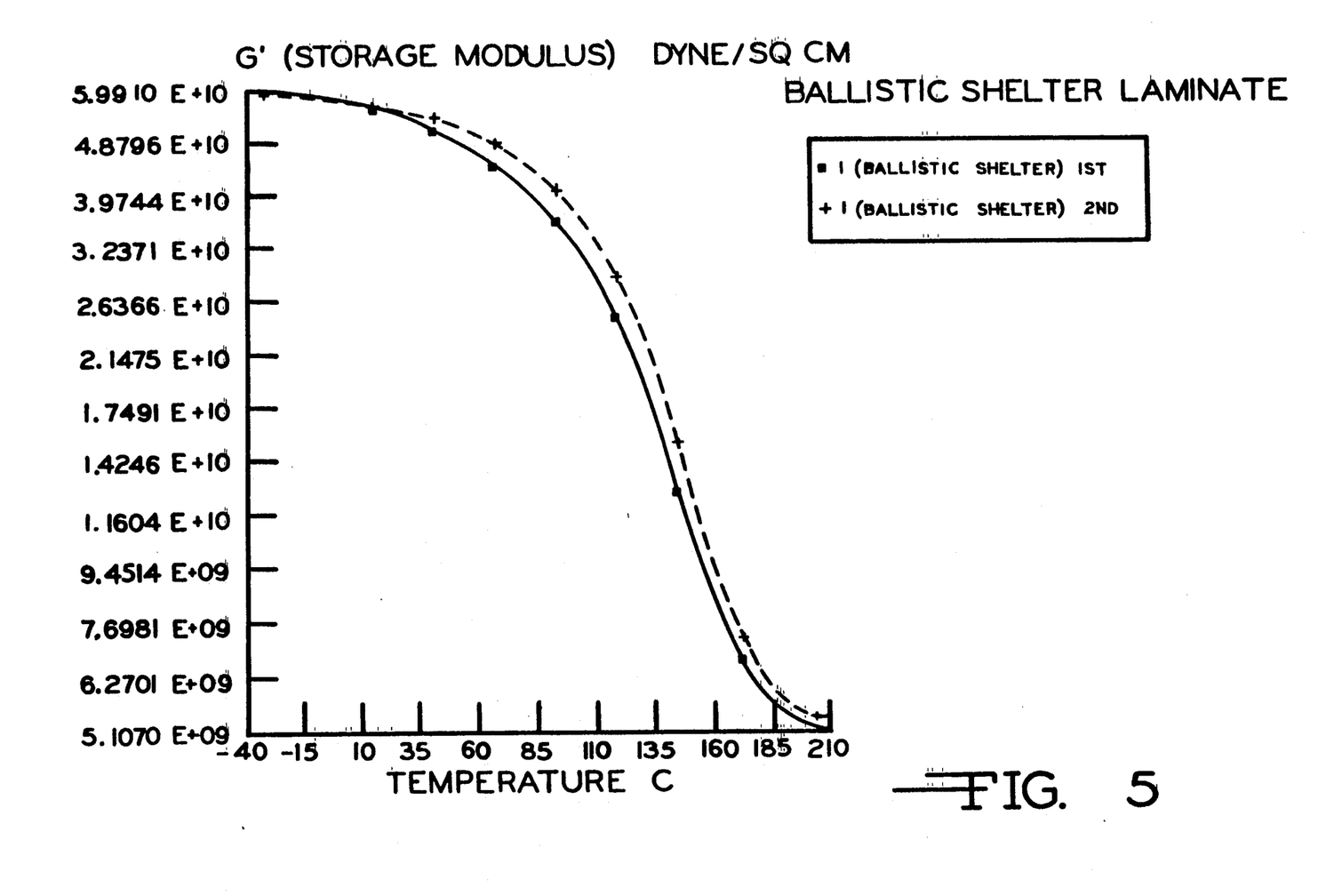
FIGS. 5-8 are a series of graphs showing the composite profiles of each dynamic property of the composite described in Example II.
Figure 6:
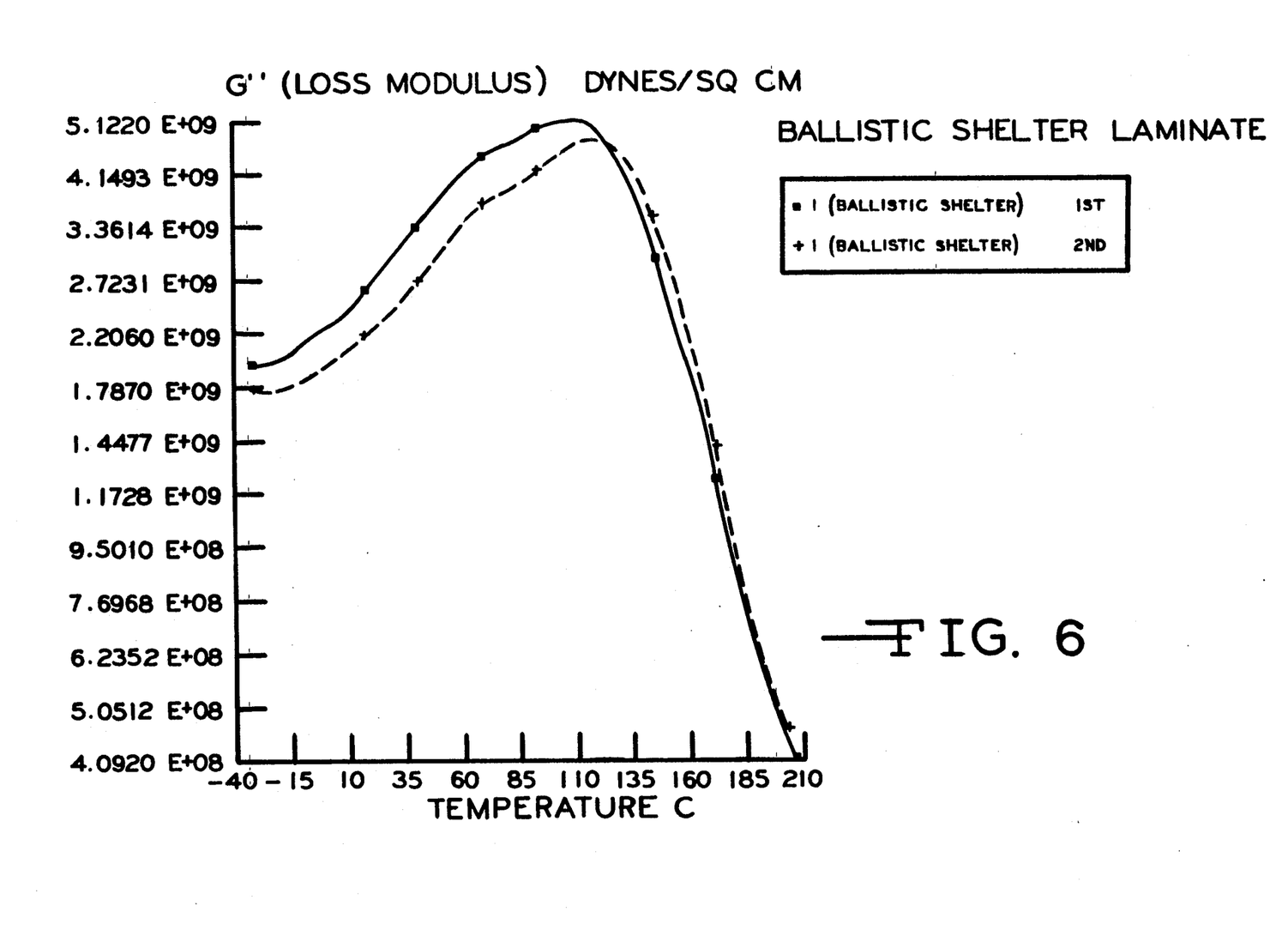
Figure 7:
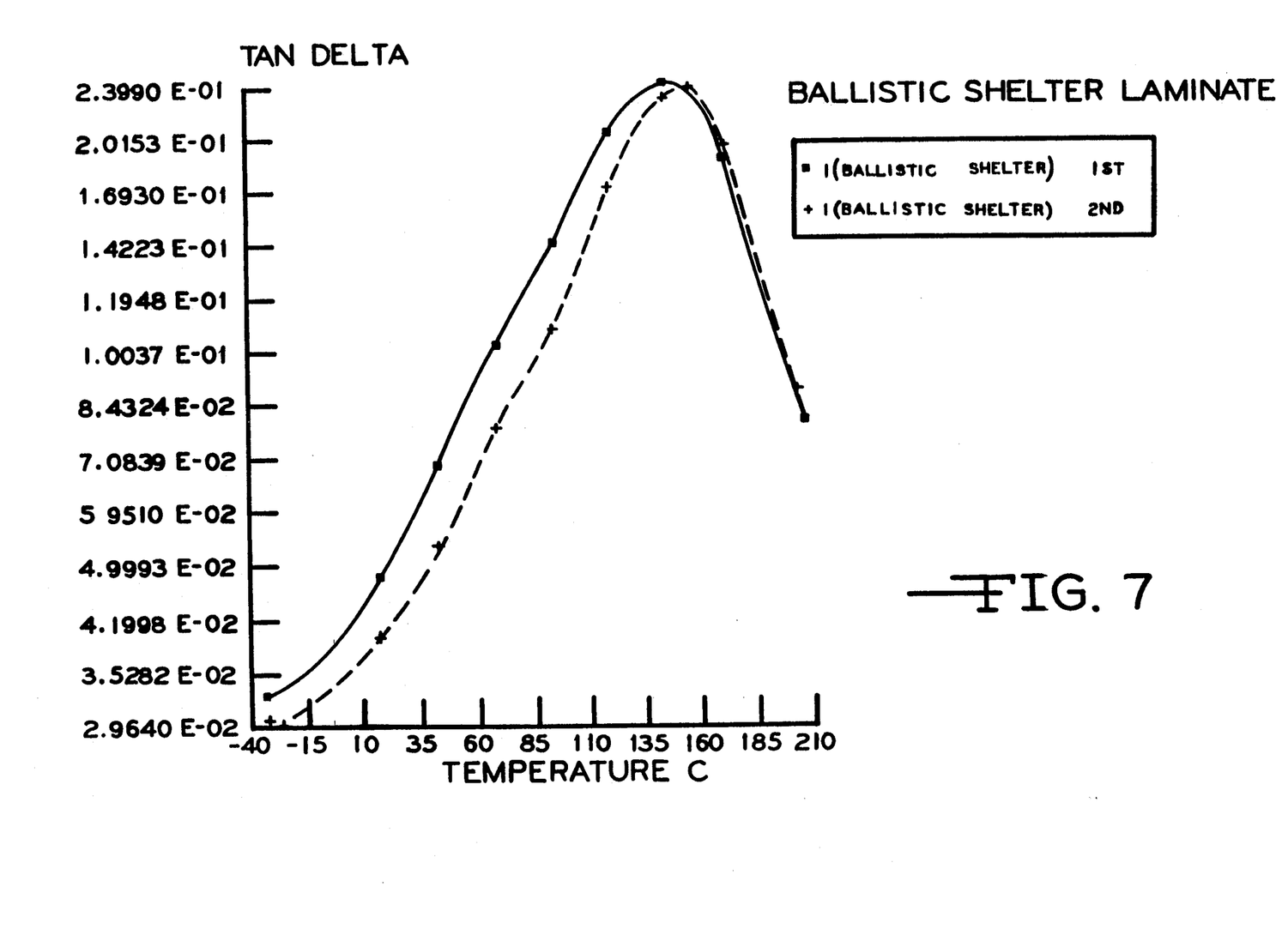

The dynamic mechanical properties of the sample were measured as a function of temperature in a rectangular torsion mode on a Rheometrics Dynamic Spectrometer (RDS). G' (Storage Shear Modulus), G" (Loss Shear Modulus), and Tan Delta (G"/G') were measured at 5° C. increments from −30° C. to 200° C. Upon completion of this initial temperature scan, the specimen was recooled to −30° C. and a second temperature sweep was conducted. Comparisons of these "1st Scan" and "2nd Scan" profiles were then made to determine the initial degree of cure. The glass transition temperature (Tg) for each test was determined from the extrapolated onset on the G' transition. Each test was conducted at a constant strain of 0.1% and a constant frequency of 1.0 Hertz. Composite profiles of each dynamic mechanical property are shown in FIGS. 5-7.

The results of the dynamic mechanical analysis wherein the Tg "1st Scan" was 98° C. and the Tg "2nd Scan" was 104° C., indicate that the submitted sample was only slightly undercured. Tg results show only a 0.6° C. increase from "1st Scan" to "2nd Scan". The molecular weight distribution is characterized by examining the breadth of the G" peak. A broad molecular weight distribution is associated with a broad or plateaued G" peak while a narrow molecular weight distribution is associated with a narrow, well-defined G" peak indicating a broad molecular weight distribution.

Figure 8:
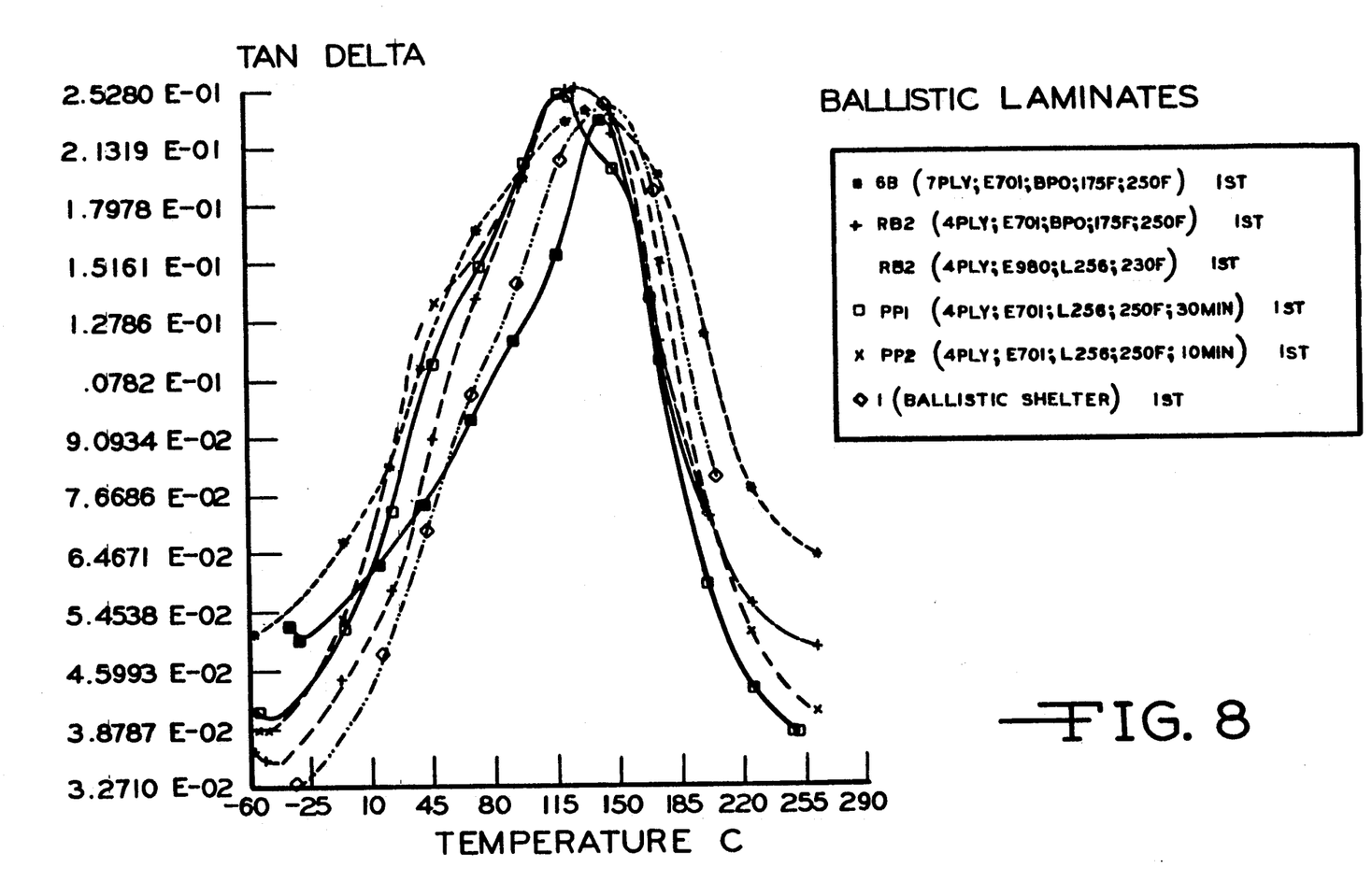

Referring now in particular to FIG. 8, the dynamic mechanical properties, as measured by the Tan Delta [G"(storage shear modulus)/G'(loss shear modulus)], of various samples of ballistic laminate sections produced according to the process of the present invention were tested.

EXAMPLE III

A sample comprising 70% P-340 resin/30% methylmethacrylate (MMA) solvent, was tested to determine whether the methylmethacrylate solvent crosslinked with polyester prepolymer. Differential scanning calorimetry (DSC) was used to evaluate the glass transition temperature (Tg) of methylmethacrylate or some derivative of polymethylmethacrylate (PMMA) as an indicator for crosslinking.

A DuPont 910 Differential Scanning Calorimeter (DSC) was used to analyze the P-340 MMA sample in which the difference in energy inputs into a substance and a reference material are measured as a function of temperature while the substance and reference material are subjected to a controlled temperature program. The DSC cell was calibrated with an indium standard for temperature and calorimetric response.

The sample was encapsulated into a DSC pan and heated from 25° C. to 220° C. at a programmed heating rate of 10° C./min. A flowing stream of nitrogen was passed over the sample during heating. After the first heating cycle was completed, the sample was cooled to 25° C., and heated a second time at the same heating program.

Figure 9:
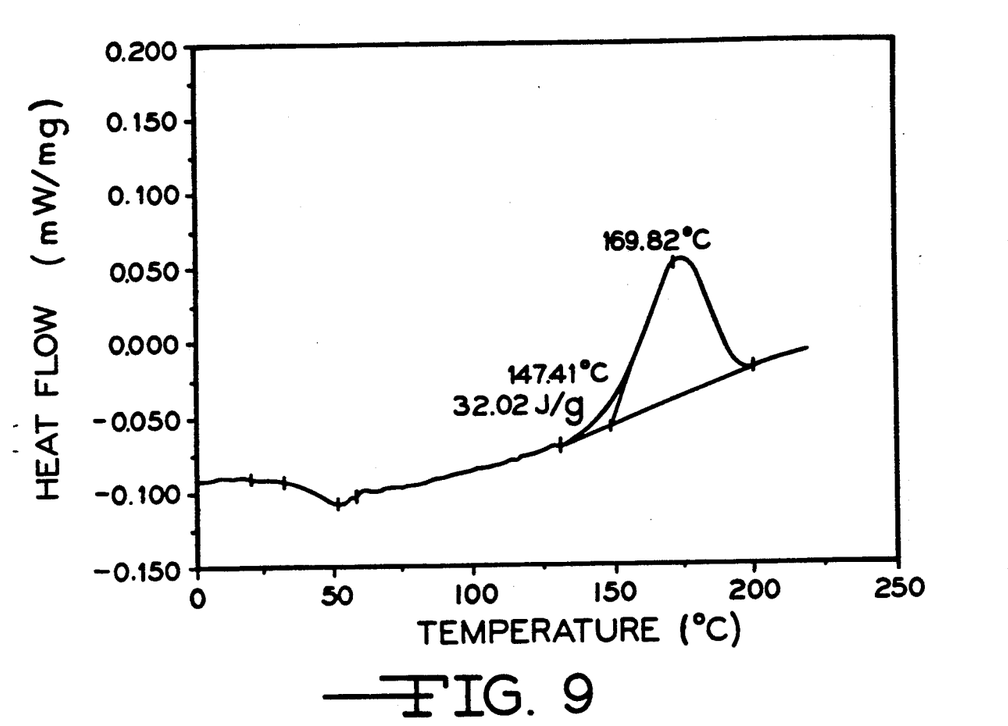
FIGS. 9 and 10 are graphs showing the differential scanning calorimetry of the composite described in Example III.
Figure 10:
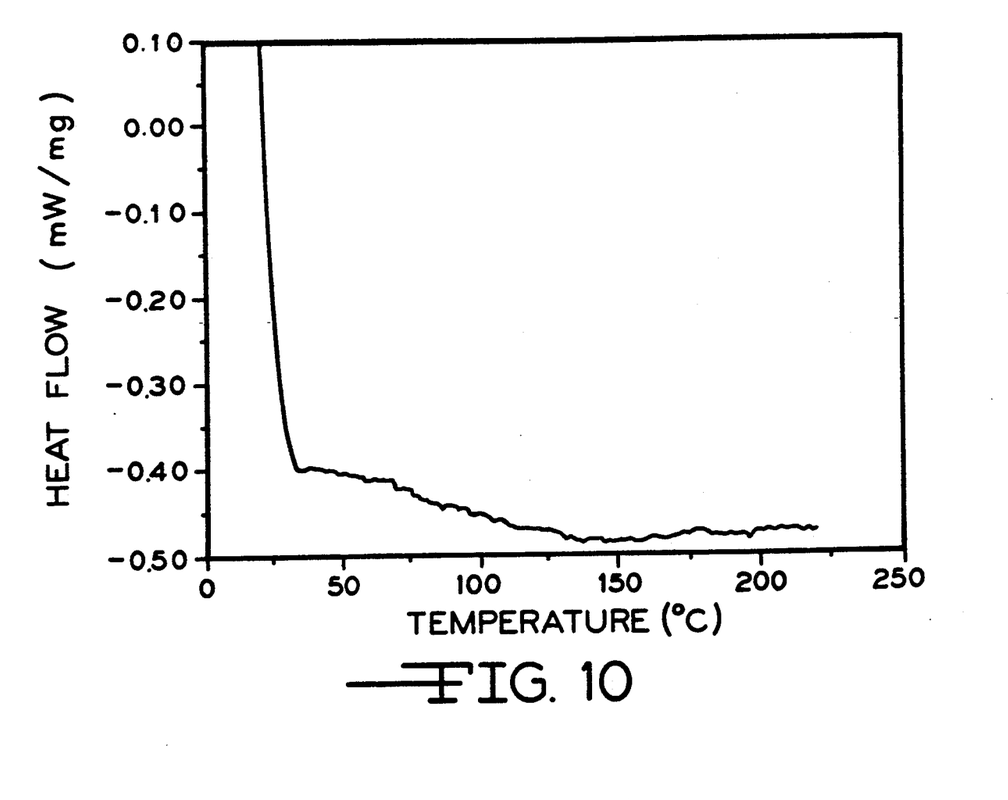

The glass transition temperature for the polyester (110° C.) and the polymethylmethacrylate (121° C.) was not detected. However, an exothermic reaction occurred with an onset temperature of 147° C. and a peak maximum temperature of 169.8° C. The heat of reaction was 32.0 J/g, as can be seen in FIG. 9. Since no glass transition temperatures were detected, crosslinking between the two polymers did occur and some residual crosslinking was induced by heating the sample. Heating the same sample a second time revealed no exotherm, which indicated the sample became totally crosslinked, as shown in FIG. 10.

EXAMPLE IV

The resin/filler formulations listed in the attached Table I have acceptable limiting oxygen index performance when used in ballistic laminates. Eleven formulations were tested, and all eleven had acceptable performance. In addition, the data indicates that the addition of a halogneated additive, such as 10 phr Xyrex ® (a brominated additive, namely diallyl tetrabromophthalate available from the FMC Corporation) increases the limiting oxygen index 3.5, on an average; the increase of aluminum trihydrate concentration from 30 phr to 60 phr increases the limiting oxygen index 6.5 at 23° C. and 6.0 at 150° C.

The resin/filler formulation listed in Table I had an acceptable limiting oxygen index. The limiting oxygen index was measured at both 23° C. and 150° C. Acceptable performance was defined as limiting oxygen index at both 23° C. and 150° C. greater than 27 percent.

Three variables were evaluated: the type of flame retardant material (comprising aluminum trihydrate), the quantity of flame retardant material (aluminum trihydrate), and the quantity of halogenated additive (Xyrex®). To examine these variables, a $2^3$ factorial experimental design was used. The levels of the variables are given below in Table 2.

TABLE 1

Resin/Filler formulations (in phr) Used in This Study

| | FORMULATION ID | | | | | | | | | | |
|---|---|---|---|---|---|---|---|---|---|---|---|
| Component | 1 | 2 | 3 | 4 | 5 | 6 | 7 | 8 | 9 | 10 | 11 |
| E-701 | 100 | 100 | 100 | 100 | 100 | 100 | 100 | 100 | 100 | 100 | 100 |
| t-BPB | 0.5 | 0.5 | 0.5 | 0.5 | 0.5 | 0.5 | 0.5 | 0.5 | 0.5 | 0.5 | 0.5 |
| H$_2$O | — | — | — | — | — | — | — | — | — | — | 0.05 |
| PG9104 | 8.35 | 8.35 | 8.35 | 8.35 | 8.35 | 8.35 | 8.35 | 8.35 | 8.35 | 8.35 | 3.33 |
| ATH(332) | 30 | 60 | 30 | 60 | 45 | — | — | — | — | — | 25 |
| ATH(710) | — | — | — | — | — | 30 | 60 | 30 | 60 | 45 | — |
| Xyrex$^R$ | 0 | 0 | 10 | 10 | 5 | 0 | 0 | 10 | 10 | 5 | — |

TABLE 2

| Variable | Low Level | High Level |
|---|---|---|
| Type of aluminum trihydrate | Solem 332 | Hydral 710 |
| Quantity of aluminum trihydrate | 30 phr | 60 phr |
| Quantity of Xyrex ® | 0 phr | 10 phr |

S-2 Glass® woven roving (plain weave, 24 ounce/yard$^2$, 636 size) was impregnated on a sheet molding compound machine using the formulations given in Table 1. In Table 1, formulation 11 is not part of the factorial experiment but is a "control". The impregnated woven roving was molded into 6-ply laminates, nominally ⅛ inch thick. The laminates were molded at 250° F. for 30 minutes.

The experimental results are given in Table 3. From this data, it is seen that all the laminates meet the proposed guidelines, and that increasing the aluminum trihydrate concentration from 30 phr to 60 phr increases the limiting oxygen index, increasing the Xyrex ® halogenated additives concentration from 0 phr to 10 phr increases the limiting oxygen index and, to meet the fire/smoke guidelines, the resin content in the laminate is preferably less than approximately 35 volume percent, and some (perhaps 20 phr) aluminum trihydrate may be desired.

TABLE 3

| Formulation ID | Limiting Oxygen Index | |
|---|---|---|
| | 23° C. | 150° C. |
| 1 | 35 | 35 |
| 2 | 35 | 39 |
| 3 | 34 | 38 |
| 4 | 39 | 43 |
| 5 | 38 | 40 |
| 6 | 30 | 34 |
| 7 | 40 | 43 |
| 8 | 35 | 39 |
| 9 | 46 | 45 |
| 10 | 41 | 42 |
| 11 | 33 | 35 |

TABLE 3-continued

| Formulation ID | Limiting Oxygen Index | |
|---|---|---|
| | 23° C. | 150° C. |
| Guideline | 27 | 27 |

EXAMPLE V

The measures of armor performance are ballistic limit (V50) and areal density. V50 is defined as the velocity at which the probability is 50 percent for complete penetration of the target. In practice, it is usually taken as the average of the highest partial penetration and the lowest complete penetration. Complete penetration is defined as an impact that produced a hole that would pass light in a 0.020 inch 2024-T3 witness plate placed behind the target. Areal density is defined as the weight per unit area.

The flat plate ballistic resistant composites formed according to the present invention, when formed to a thickness on the order of about ⅛ to about ½ inch with an area density of about 4.2 pounds/square foot, have a $V_{50}$ value (protection ballistic limit) in excess of about 1,977 feet per second up to as high as about 2,300 feet per second or higher (with 44 grain steel 0.30 caliber fragment simulating projectiles).

It will be evidenced from the foregoing that various modifications can be made to the method of this invention. Such, however, are within the scope of the claimed invention.

We claim:

1. A process for a forming ballistic resistant composite which comprises:
   (a) impregnating a low-alkali magnesia-aluminum-silicate glass fiber woven roving with an impregnating composition in an amount sufficient to produce a composite containing about 75 to 85%, by weight, of glass which impregnating composition is comprised of (i) a resin solution comprising a polyester resin in a polymerizable monomeric solvent and (ii) a free radical catalyst and,
   (b) curing the impregnated woven roving in a sheet compression molding unit at a temperature of about 225°–255° F. for about 15–30 minutes to allow the impregnated woven roving to substantially conform to the mold unit, at a pressure of about 100–600 psi sufficient to maintain the exothermic temperature at about 300° F. or below and to catalytically crosslink the polyester resin and monomeric solvent.

2. The process of claim 1, in which the ballistic resistant composite has thickness of between about 1/16 to about 3 inches.

3. The process of claim 1, in which the polyester resin has an acid number of less than about 23.

4. The process of claim 1, in which the polyester resin comprises an isophthalic-maleic-propylene glycol polyester resin.

5. The process of claim 1, in which the polyester resin comprises a maleic-propylene polyester resin.

6. The process of claim 1, in which the polymerizable monomeric solvent is selected from the group consisting of styrene, diallyl phthalate and methylmethacrylate or any combination thereof.

7. The process of claim 1, in which the free radical catalyst is selected from the group consisting of tertiary butyl perbenzoate, benzoyl peroxide and 2,5-dimethyl-2,5-bis(2-ethylhexanoylperoxy)hexane, or any combination thereof.

8. The process of claim 1, in which the free radical catalyst comprises tertiary butyl perbenzoate present in the impregnating composition in about 0.5%, by weight.

9. The process of claim 1, in which the impregnating composition includes a thickening agent which comprises calcium hydroxide.

10. The process of claim 1, in which the impregnating composition comprises a flame retardant material which comprises a hydrated alumina.

11. The process of claim 1, in which the glass fiber woven roving is selected from a group consisting of a plain weave, twill weave or satin weave woven roving and a unidirectional cross ply weave.

12. The process of claim 1, in which the glass fiber woven roving has a weight per unit area of between about 18 to 48 ounces per square yard.

13. The process of claim 11, in which the glass fiber woven roving is sized with a size composition selected from the group consisting of (a) an epoxy film former and an epoxy silane coupling agent, and (b) an epoxy film former and a methylsilane coupling agent.

14. The process of claim 13 in which the epoxy silane coupling agent comprises gamma-glycidoxypropyltrimethoxy silane.

15. The process of claim 13 in which the methyl silane coupling agent comprises methyltrimethoxy silane.

* * * * *